United States Patent [19]

Andrews, Jr.

[11] Patent Number: 5,062,085
[45] Date of Patent: Oct. 29, 1991

[54] VIBRATION ISOLATION MODULE FOR TOWED SEISMIC ARRAYS

[76] Inventor: Daniel E. Andrews, Jr., 1563 Yost Dr., San Diego, Calif. 92109

[21] Appl. No.: 582,102

[22] Filed: Feb. 21, 1984

[51] Int. Cl.$^5$ ............................ G01V 1/38; H01B 7/12
[52] U.S. Cl. .................................... 367/20; 367/154; 174/101.5
[58] Field of Search ..................... 367/20, 153, 154; 114/242, 247, 253; 174/42, 101.5

[56] References Cited

U.S. PATENT DOCUMENTS

| | | | |
|---|---|---|---|
| 2,469,167 | 5/1949 | Little | 174/42 |
| 2,587,521 | 2/1952 | Peterson | 248/63 |
| 2,604,883 | 7/1952 | de Vitry D'Avaucourt | 125/12 |
| 2,609,653 | 9/1952 | Peterson | 57/145 |
| 3,353,817 | 11/1967 | Bollinger | 267/69 |
| 3,686,855 | 8/1972 | Falcy et al. | 57/145 |
| 3,696,325 | 10/1972 | Tallman | 174/42 |
| 3,744,016 | 7/1973 | Davis | 367/154 |
| 3,806,627 | 4/1974 | Harmon | 174/42 |
| 3,884,173 | 5/1975 | Fabula | 114/235 F |
| 4,241,427 | 12/1980 | Swenson | 367/210 |

FOREIGN PATENT DOCUMENTS

0007585  1/1979  Japan ........................ 174/42

Primary Examiner—Ian J. Lobo
Attorney, Agent, or Firm—Harvey Fendelman; Thomas Glenn Keough

[57] ABSTRACT

Longitudinal shocks and longitudinal emotional disturbances are reduced between members attached to opposite ends of a vibration isolation module. An elongate, essentially cylindrically shaped cord extends the length of the module and is fabricated from a compliant and dissipative material. At least one cord-like essentially nonextensible member is wound about the core in a helical fashion with at least one symmetrically located pitch reversal, and with attachment to the core at least at the ends and pitch reversal points. Longitudinal shocks and motional disturbances are translated by the essentially nonextensible cord-like member into torsional shear strains in the compliant core. The dissipative characteristics of the core material coupled with the nonlinear relationship between longitudinal and torsional strain produce a tensile shock absorber with both damping and a spring constant that increases with longitudinal strain. A flexible outer jacket covers the core and cord-like nonextensible members and help share the shocks and motional disturbances as well as containing a fill fluid that aids the core and jacket by viscously dissipating part of the shocks and motional disturbances, including a series of helical pitch reverses in the nonextensible cord-like member along a module's length and having annular spacers disposed between the core and jacket and located at nodes between successive pitch reversals helps assure the integrity of the module and presents a streamlined surface to reduce the problems associated with excessive flow noise.

40 Claims, 10 Drawing Sheets

VIBRATION ISOLATION MODULE FOR TOWED SEISMIC ARRAYS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Towed seismic streamers containing a hydrophone array have been in use for some time as data gatherers. The information obtained has been of particular interest for oil exploration, and other marine geophysical studies, to name a few. Typical examples of the evolving state-of-the-art are shown in U.S. Pat. No. 2,465,696 to Leroy C. Paslay for his Method and Means of Surveying Geological Formations; the Pressure Cable Construction of F. G. Blake et al in U.S. Pat. No. 2,791,757; the Method and Underwater Streamer Apparatus for Improving the Fidelity of Recorded Seismic Signals of G. M. Pavey, Jr. et al in U.S. Pat. No. 3,290,645 as well as Pavey's later apparatus of U.S. Pat. No. 3,319,734; Frank R. Abbott's Towable Sonar Array With Depth Compensation of U.S. Pat. No. 3,868,623 and J. J. Babbs Shallow Water Seismic Prospecting Cable of U.S. Pat. No. 3,435,410. These patents show typical examples of the efforts undertaken to upgrade the validity of the data obtained by using improved transducers, data processing techniques and general design considerations. All these designs represent advances in the state-of-the-art; however, it is safe to say that all would seek to improve the validity of the collected data to one degree or another.

One aspect of design allowing the quality of the gathered data to be improved is the provision of a device for blocking mechanical shocks and vibrations originating in other structural members from reaching the array. The streamlined outer surface presented by a hose-like sheath in most of the patents cited above represents an attempt to avoid some of the motional disturbances to the acoustic sensors. Yet, high speed towing creates unwanted shock and vibration due to unsteady motion of the towing platform, vibration of the propulsion machinery, strumming of the tow cable, and unstable motion of the drogue used to tension the array. These many mechanical disturbances, if allowed to propagate to the acoustic sections of the array, cause accelerations and pressure fluctuations within the array that are monitored and converted into erroneous signals by the receiving transducers.

An attempt to reduce the motional disturbances has been the inclusion of vibration isolation modules. Currently, the modules typically consist of an outer plastic hose, a fill fluid, an internal compliant member or members (usually in the form of a nylon rope), an internal slack essentially nonextensional member or members (usually in the form of a steel cable or a rope made of very strong, stiff aramid fiber such as that marketed under the DuPont Company trademark KEVLAR), appropriate very slack electrical conductors, and suitable end caps. At very low speeds the load of the vibration isolation module and its towed array is carried by the hose wall alone. When somewhat higher speeds are reached, the load is carried by the hose wall and the internal compliant member jointly. Within these lower speed regimes the vibration isolation module functions primarily as a spring with some damping resulting from tensional losses in both the hose wall and the compliant member and from viscous flow in the fill fluid.

Traveling at some still higher speed the hose wall and compliant member "bottom out" when the essentially nonextensional member becomes taut. At this point all vibration and shock isolation is lost and the array is subject to accelerated wear and early failure.

Thus there is a continuing need in the state-of-the-art for a vibration isolation module that provides for greater damping and higher dynamic range without "bottoming out" or being permanently stretched, and which also more effectively reduces the influences of longitudinal shock and other longitudinal motional disturbances from compromising the response of the towed acoustic array. Such a device would also find applications where such shocks and disturbances were to be isolated from members attached to opposite ends of the modules such as in a restraint harness, between a towed barge and a tug or in an instrumentation package suspended from shipboard or a buoy.

SUMMARY OF THE INVENTION

The present invention is directed to providing an apparatus for providing longitudinal shock mitigation and reducing the influences of longitudinal motional disturbances between members coupled to its opposite ends while permitting desired communication between these opposite ends whether by electrical conductors, optical fibers, or tubes. A cylindrically-shaped elongated core is coupled between the members for compliantly and dissipatively yielding and at least one cord-like or ribbon-like essentially nonextensible high-strength member is disposed about the core in a helical fashion having at least one symmetrically-located pitch reversal. Note: What is meant here and elsewhere with reference to the high strength member or members by the terms "essentially nonextensible" is that the product of the cross-sectional area of the strength member and its Young's modulus is very high in comparison with that of the core. Thus, the cord-like member has the property of being relatively nonextensible as compared to the core. This high-strength member is attached to the core at least at the point of pitch reversal and to the end members for imparting torsional strains to the compliantly and dissipatively yielding core, which strains are non-linearly related to the steady strain and the longitudinal shock and motional disturbances. A hose-like sheath is disposed to contain both these members as well as a viscous fill fluid. The sheath further provides for additional shock and motional disturbance reduction as the apparatus is longitudinally stretched. A plurality of the cord-like or ribbon-like high-strength essentially nonextensible members can be provided, each having one or more pitch reversals so long as the helical angles and directions for all the non-extensible members are the same, the pitch reversals occur at common stations along the core, and the nonextensible members are attached to the end members and to the core at least where the common pitch reversals occur. The tensile reaction for small extensions is dominated by the initial pitch of the cord-like torsion producing member and the elastic properties of the core. The tensile reaction for large extensions are dominated by the elastic properties of the cord-like torsion producing members, themselves, allowing appropriate selection of the initial and final slopes of the tension vs. elongation curve and the location of the knee therein. Thusly configured, the acoustic performance of an array is improved. Other applications of the module are to improve the towing characteristics of a barge being towed by a tug or other vessel, the securing of an occupant in a seat by a harness arrangement joined to an appropriately modified module, motion reduction of instrumentation packages suspended from a ship or buoy and other applications where shocks and disturbances are to be isolated.

It is a prime object of the invention to provide an apparatus for mitigating longitudinal shocks and the influences of longitudinal motional disturbances while permitting the communication of power and intelligence between its opposite ends.

Another object of the invention is to provide a shock and disturbance reducer having a nonlinear, longitudinal stress/strain characteristic with a desirable dissipation capability.

Yet another object of the invention is to provide a shock and disturbance reducer which transforms longitudinal stresses to torsional strains.

A further object of the invention is to provide an essentially cylindrically shaped core of elastomer having at least one cord-like or ribbon-like essentially nonextensible strength member wrapped about in a helical configuration having at least one symmetrically disposed pitch reversal for translating longitudinal stresses to torsional strains.

Yet still another object is to provide a vibration isolation module having a nonlinear torsional strain converting section for reducing the effects of shock and severe longitudinal motional disturbances.

Still another object of the invention is to provide a vibration isolation module having a nonlinear torsional strain dissipative member cooperating with a coaxially disposed longitudinal strain converting member for sharing the stresses imposed by longitudinal shocks and longitudinal motional disturbances.

Still another object of the invention is to provide a torsional strain dissipative member, a coaxially disposed longitudinal strain producing member having an interposed viscous fluid that provides, through shear losses, an additive reduction of longitudinal shock and motional disturbances.

Still another object is to provide a vibration isolation module that utilizes a lossy elastomeric core in which longitudinal stretching of the module is converted into both longitudinal stretching and torsional shear of the core.

Another object is to provide a vibration isolation module that converts longitudinal stresses into torsional motion to greatly increase the shear losses and its motion relative to a fill fluid to greatly increase the viscous damping thereof between a core and a jacket.

Yet another object is to provide a vibration isolation module producing a longitudinal stress to torsional shear conversion that is nonlinear with a conversion ratio such that the effective spring constant of the module increases with increasing steady tension that correlates to increasing tow speed.

Still another object is to provide a vibration isolation module having a spring constant which increases with tension to support a much greater drag at higher tow speeds without undue stretching or "bottoming out".

Other objects, advantages and novel features of the invention will become apparent from the following detailed description of the invention when considered in conjunction with the accompanying drawings.

DESCRIPTION OF THE PREFERRED EMBODIMENT

Figure 1:
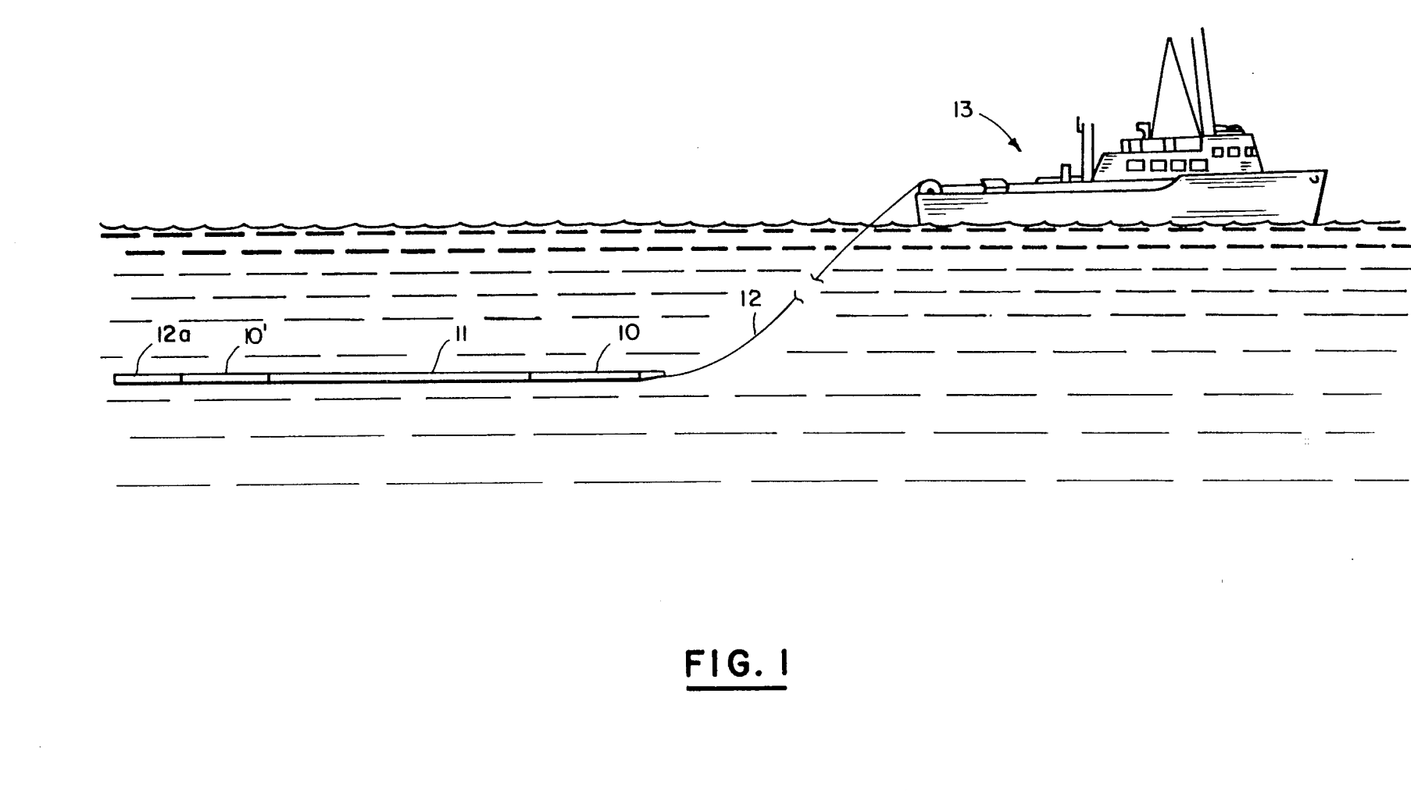
FIG. 1 is a sketch depicting at least one vibration isolation module interposed between an acoustic array and a towing cable from a ship.

Referring now to the drawings and in particular to FIG. 1, a vibration isolation module 10 is coupled between an acoustic array 11 and a towing cable 12 pulled through the water by a support vessel 13. At the tail end of the array, another vibration isolation module 10' provides isolation between the array and the rope or other drogue 12A used to tension the array. Although the towing vessel is shown as a surface craft, many of the adverse influences on a towed hose-like transducer array are eliminated when a submersible is used as the towing vessel. Also, although not shown in the figure, if one or more separate arrays are added, additional modules can be interposed to isolate one array from another.

The many very sensitive transducer elements disposed along the array's length, in addition to being responsive to the signals of interest, are also responsive to the longitudinal disturbances and the pressure waves created by them. These unwanted disturbances tend to hide the signals of interest and also often produce highly misleading data. These deleterious motional disturbances can be attributed to machinery vibrations, to the roll, pitch, heave and yaw of the towing platform, to strumming of the towing cable, and to the unsteady motion of the drogue, all of these effects becoming more severe as higher towing speeds are reached. Vibration isolation module 10 (and 10') forming the subject matter of invention reduces the effects of the longitudinal motional disturbances, and the destructive effects accompanying longitudinal shocks when conventional vibration isolation modules "bottom out".

Figure 2:
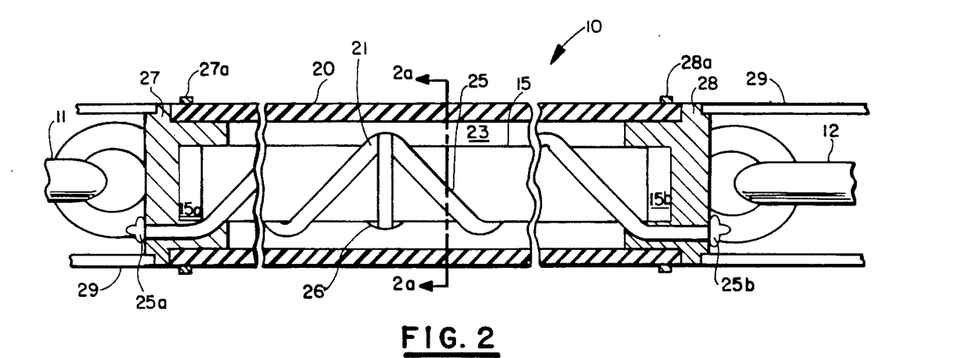
FIG. 2 is a vibration isolation module partially in cross-section that shows one pitch reversal of an essentially nonextensible cord located outside the elastomeric core and secured onto the core by a clamp where the pitch reversal occurs. (For simplicity, no additional means for conveying intelligence or power is shown).
Figure 3:
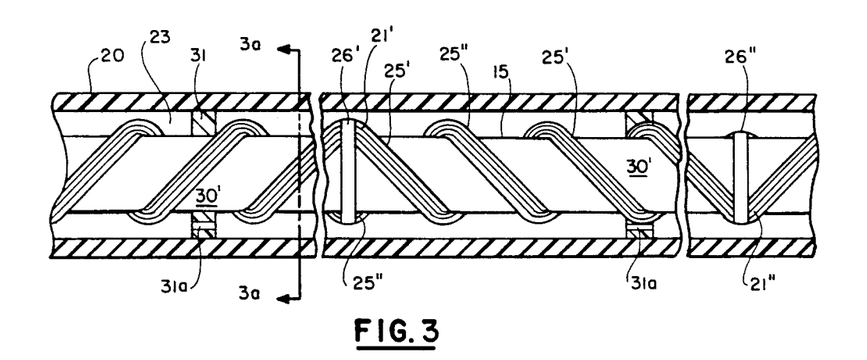
FIG. 3 is a vibration isolation module depicted partially in cross-section having two essentially nonextensible strength members and two pitch reversal sites with the strength members being secured by clamps at least at the pitch reversal points. Also included is an annular spacer at a node midway between the two pitch reversals, which assists in mode conversion and transfers load in the hosewall to the core.
Figure 3A:
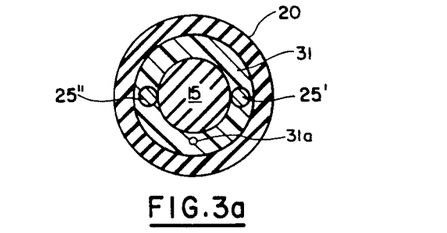
FIG. 3a is a cross-sectional representation of the embodiment of FIG. 3 shown generally along lines 3a—3a in FIG. 3.
Figures 4, 4A, 4B:
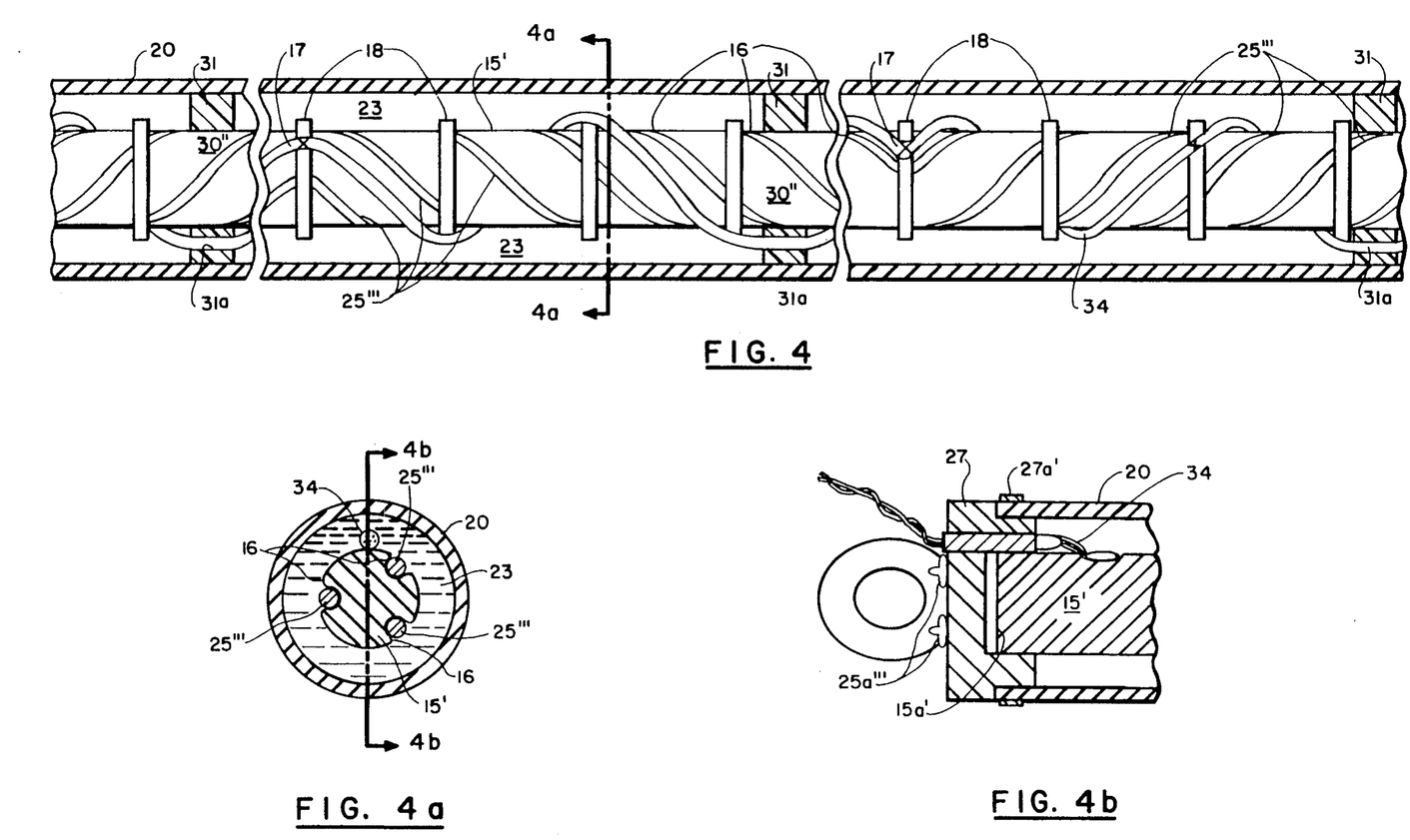
FIG. 4 is another embodiment of a vibration isolation module having three (or more) nonextensible cords each disposed in a separate helical groove provided in the compliant core with annular spacers disposed at the nodes located midway between consecutive pitch reversals.
FIG. 4a is a cross-sectional representation of the embodiment of FIG. 4 shown generally along lines 4a—4a in FIG. 4.
FIG. 4b is a cross-sectional view of the embodiment of FIG. 4 shown along lines 4b—4b in FIG. 4a depicting one end cap and the nonextensible cord interconnection of the embodiment of FIG. 4. Although the termination of each cord in the end cap is shown only schematically in the figure, a wide variety of in-line terminations is available, ranging from swaged sleeves and ferrules to wedging plug and socket combinations.

Looking to FIGS. 2 through 4 where like reference characters depict like or substantially similar elements, vibration isolation module 10 includes as the principal longitudinal load-bearing members a core assembly, consisting of items 15, 25, and 26 and 18, and 31, if used, and coaxially disposed jacket 20. The core 15 of the core assembly is essentially a lossy elastomeric material which is selected to translate longitudinal stresses into torsional shear strains in a manner to be elaborated on below. The conversion of tensile strain to mechanically amplified torsional shear has been found to provide greatly increased dissipation, and the nonlinear conversion mechanism used allows equal incremental increases in shear stress to balance disproportionately larger and larger tensile forces. This bestows on the mechanism a nonlinear spring constant, and allows the vibration isolation module to accommodate the much greater drag produced by longer arrays and higher towing speeds, without unduly stretching or "bottoming out".

The elastomeric material selected for the core possesses a usefully high loss tangent, low tensile and shear modului, a high permissible elongation, a low tensile set and a good resistance to the aliphatic hydrocarbon or other fill fluid 23 disposed in the annular space formed between the core and the jacket. One highly suitable core material now appears to be an ethylene/acrylic elastomer marketed by DuPont under the tradename "VAMAC". This material has a loss tangent of 0.24 to 0.32 at typical ocean temperatures. An approximately one inch diameter core of "VAMAC" of various lengths has been found to provide the desired descriptive properties for the anticipated towed array application. Other elastomers, such as butyl rubber, are also useful in those applications in which any swelling effect caused by the fill fluid can be avoided.

The material for the jacket of the vibration isolation module is selected to provide some longitudinal load sharing between the core assembly and jacket over the operating speed range of the towed array. Selecting a commercially available properly dimensioned sheath or jacket material fabricated from either an ether-base polyurethane or from a polyvinyl chloride material having low-temperature flexibility and an ultra-violet inhibitor has been found to be suitable for a variety of array lengths and speeds.

Figure 2A:
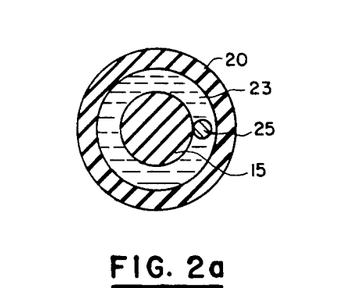
FIG. 2a is a cross-sectional end view of the embodiment of FIG. 2 shown generally along lines 2a—2a in FIG. 2.

The ultimate longitudinal stretch of the vibration isolation module, including the core and sheath, is limited by one or more essentially nonextensible cord-like members 25. The cord-like members can have a circular cross-sectional shape like a true cord or have a flattened appearance like a ribbon. In either case they function to transmit forces and loads. The embodiment of FIG. 2 and 2a shows a single cord-like member 25 helically extending along the length of the compliant core and having a single pitch reversal 21 and a pitch reversal clamp 26 at the mid-length point of the core. The embodiment of FIG. 3 shows a pair of cooperating but diametrically opposed, essentially nonextensible cord-like members 25' and 25" wrapped with equal pitch about the compliant core 15 having a pair of pitch reversals 21' and 21" at pitch reversal clamps 26' and 26", with the pitch reversal points being located at the one-quarter and three-quarter length positions. The embodiment of FIG. 4 shows three essentially nonextensible cord-like members 25''' being symmetrically disposed about the center of the core, having identical pitch and having several common uniformly spaced pitch reversal points. In any embodiment or further modifications not specifically described, one or more essentially nonextensible cord-like or ribbon-like members determines the ultimate stretch of the module that is capable of producing torsional shear in the core. Here it should be pointed out again, that the term "essentially nonextensible" is used to mean that the ratio of the tensile stiffness of the cords or ribbons to that of the core is large or very large, and that, by reason of the nonlinear relation between tension in the cords and the torsional reaction, this ultimate longitudinal stretch is beyond the best operating point for the system.

Referring back to FIG. 2, each end of the essentially nonextensible cord-like member is secured to a fitting or end cap 27 to transmit the steady component of the tension and to assure that responsive longitudinal motional disturbance is longitudinally reduced as well as torsionally dissipated. The fitting or caps are provided with pad eyes for connection to the towing cable 12 and array 11. Pad eyes, as such, are shown for demonstration purposes only. Obviously, many different types of presently available mechanical connections would serve this purpose. The connections preferably are streamlined or contained in streamlined housings 28 to avoid turbulence caused by hydrodynamic flow. Jacket 20 is bonded to the end caps using suitable adhesives and sometimes constricting metal straps or high-strength wrappings 27a and 28a are suitably applied to hold the jacket more securely on the caps. The straps or wrappings also are configured to reduce the problems associated with hydrodynamic flow.

In the FIG. 2 embodiment, pitch reversal clamp 26 secures the essentially nonextensible member 25 to a point 30 of helical pitch reversal of the essentially nonextensible member on elastomeric core 15. The opposite ends 25a and 25b of the cord-like member are secured to end caps 27 and 28. Ends 25a and 25b are shown as having been passed through holes in the end caps and then secured with knots. Other stronger securing means could be, and usually are, employed. For example, the knots could have been replaced or augmented with swaged or crimped ferrules or the ends could have been unwraveled and potted in plastic or socket-and-plug in-line terminations could have been used. With the arrangement shown in FIG. 2, the opposite ends 15a and 15b of the core are bonded or otherwise suitably secured in end caps 27 and 28. The single essentially nonextensible cord, having a single pitch reversal at the pitch reversal clamp, causes the varying longitudinal motion between the two end caps to create torsional forces that twist the core in torsional shear about its longitudinal axis when shocks or longitudinal motional disturbances are transmitted to the vibration isolation module via end cap 28 from towing cable 12. In other words, the longitudinal stresses created by the shocks and motional disturbances are translated into torsional shear strains within the compliant core member. These strains are in addition to the longitudinal strain borne by the compliant core which is shared by the jacket that is secured onto both of the end cap members. Furthermore, the viscous fluid in between the jacket and core provides additional attenuation of the varying longitudinal stresses through viscous shear dissipation.

Referring to FIG. 3, another embodiment has two essentially nonextensible cord-like members 25' and 25" which helically extend about the elastomeric cord. The two cord-like members which are diametrically opposed have the same pitch and direction and are attached by pitch reversal clamps 26' and 26" onto the elastomeric core at the one-quarter and three-quarter length points. The two pitch reversal clamps are each coupled to both of the essentially nonextensible cord-like members 25' and 25" and impart a translation of any longitudinal extension of the assembly into oppositely directed torsional rotations. These torsional rotations act on the core at the pitch reversal points which produce torsional shear strains within the section of the elastomeric core between the two points of pitch reversal and also between each end of the core and the adjacent pitch reversal point. Approximately midway between the successive pitch reversals, a node 30 is created in which there is substantially no rotational motion of the elastomeric core. An annular spacer 31 made up of joinable segments and disposed radially outwardly of the core and between the sheath and the core is mounted at the node to snuggly fit between the jacket and core to aid in mode conversion and to transfer drag load on the covering sheath or hosewall to the core. At least one opening 31a is provided in each of the annular spacers where the pieces join to allow the passage of the electrical, optical or other conductors 34 of the array. No conductors are shown in the embodiments of FIG. 2 and 3; however, the conductors are shown in the embodiment of FIG. 4. These flexible conductors are either wrapped loosely about the assembled core, roughly matching the pitch and direction of the cords or they are laid in a serpentine pattern between the core and outer jacket. In either case their length must safely exceed the maximum expected stretched out length of the module.

The essentially nonextensible cord-like members impart dissipative torsional strains to the core when the longitudinal shocks and motional disturbances would otherwise be transmitted to the array. The most nonextensible members were fabricated from a number of strands of an aramid fiber marketed under the registered trademark KEVLAR by E. I. DuPont. Strands fabricated from these fibers have superior tensile strength characteristics without excessive strain over the stress range of interest, and low-angle braided cord made from eight strands of the fibers covered by a woven polyester covering have proven to work in a highly satisfactory manner for translating the longitudinal stresses to torsional strains within the compliant core. Twisted and single- and double-braided cords made of other plastic fibers such as polyester, polyolefin, polypropylene and nylon have been used to achieve lower changes in the effective overall spring constant of the assembly with increasing extension, which in turn, makes the non-linear effect less severe.

Looking once again to FIG. 2, the essentially nonextensible cord-like member 25 is located on the outer surface of the compliant core in its helically extending, pitch reversing orientation. It is secured to the core at its pitch reversal clamp 26 as well as where it extends through each of the end caps and terminates in knots 25a and 25b. Optionally, it is bonded or otherwise suitably affixed along a contiguous surface where it abuts the outer surface of the elastomeric core. The embodiment of FIG. 3 having the two cord-like members 25' and 25" also could be bonded or adhered along their length to the outer surface of the compliant core as well as being secured to the pitch reversal clamps 26' and 26". Connection of the two members to the end cap could be similar to that shown with respect to FIG. 2 or as previously described. As mentioned above, when the core and cord are attached to the endcaps and are elsewhere free to rotate, the maximum rotation occurs at the pitch reversal points, and none occurs at the nodal points midway between these pitch reversals. The spacing and placement of the pitch reversal points are chosen so that the end caps also are positioned at nodal or non-rotation points. Note node 30' in FIG. 3 here, the node or non-rotating point lies halfway between the pitch reversal clamps 26' and 26". The reader will also note that the continuity breaks along the length of the module have been used in the figures to permit showing of essential structure without undue redundancy of structure in the illustration.

The embodiment of FIG. 4 has a modified compliant core member 15' that is provided with three helically extending grooves 16 provided in its outer surface layer. The grooves are cut into the core and have pitch reversals at locations generally designated by the reference character 17 where the grooves undergo a pitch reversal. Within each of the grooves a multiple strand cord-like member 25''' is disposed, it being understood that the depth of the groove is configured to receive a portion or all of a cord-like member within it. The pitch reversal clamps required on the embodiments of FIGS. 2 and 3 are not needed, but elastic retainer rings 18 hold the cord-like members within the grooves and assure the structural integrity of the module. They are spaced such that they do not interfere with annular spacers 31 provided at selected nodes 30'' wherever they occur along the length of the module. An alternate construction technique that dispences with the requirement for retainer rings is to bond or embed the cords in place in the grooves with a flexible adhesive. As mentioned before, the periodic breaks shown in the module illustration are to remove redundant portions of the module which may extend for over one hundred feet with numerous pitch reversals, it being understood that where used, the relative location of annular spacers 31 on their respective nodes are midway between successive pitch reversal locations 17. The viscous fill fluid 23 fills the space between the compliant core and the inner wall of the jacket 20 and provides for viscous damping.

The end caps for the embodiment of FIG. 4 have different configurations from those shown in earlier figures. Cap 27 and the opposite end cap (not shown in the drawings) each have a hose clamp 27a' holding jacket 20 on the end caps to permit longitudinal load sharing. The essentially nonextensible cord-like members extend through the cap in suitable terminations 25a'''. The end portion 15a' of the elastomeric core need not be bonded into a recess provided in the end cap 27 because the nonextensible cords lie in the helically extending grooves provided within the elastomeric core 15' and 15a', and the grooves in the core are keyed to the holes in the end caps, through which the cords pass and are terminated. In like manner, the opposite end of the vibration isolation module has the cord-like members terminated in the end cap there.

Figure 5A:
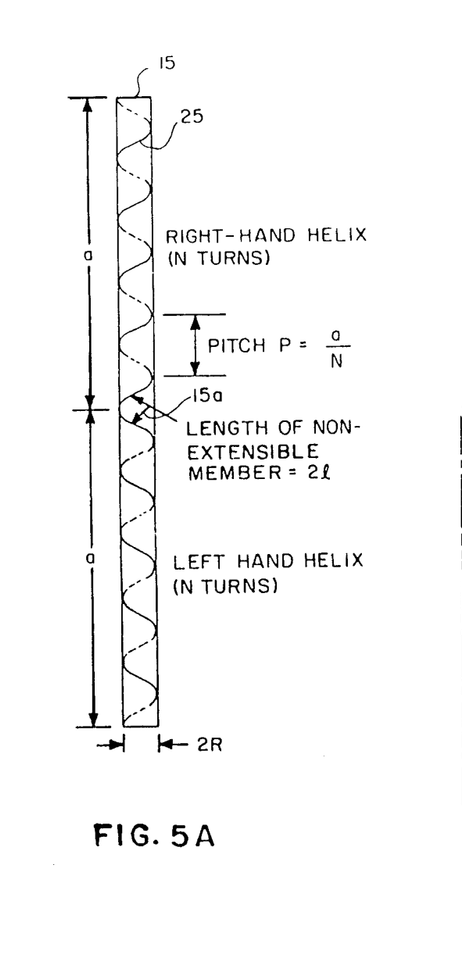
FIGS. 5a–5c present diagrams and equations relating the various variables including the rotation of the core at the pitch reversal point as a function of longitudinal strain and the initial helix angle of the nonextensible cord-like member on the compliant core.
Figure 5B:
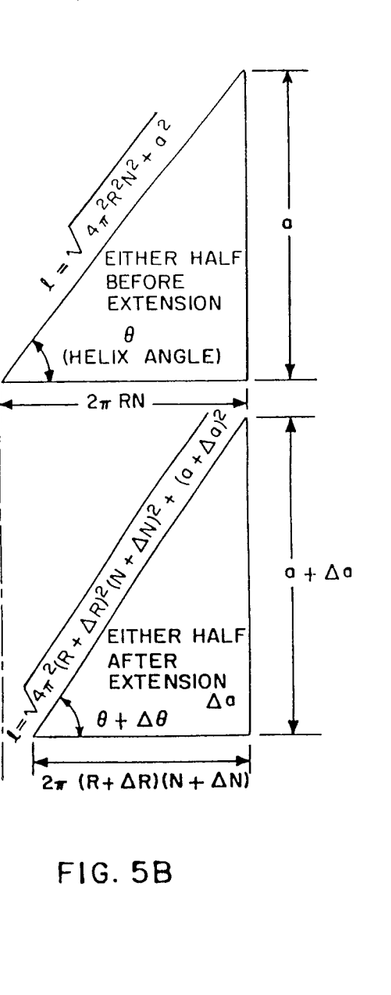
Figure 5C:
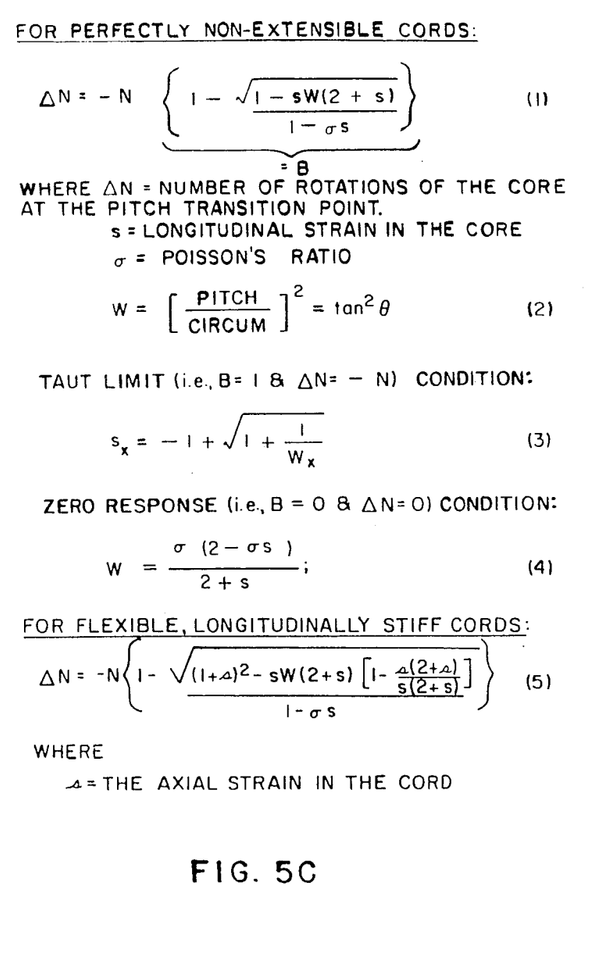

Referring now to part A of FIG. 5 of the drawings, an elastomeric core 15 has a single nonextensible cord-like member helically wrapped around it with a single pitch reversal at 15a. The upper portion of the figure has an N-turn right-hand helix extending for a distance of "a" (one half the length of the compliant core 15). At the point of pitch reversal 15a (the point where the nonextensible member is secured to the compliant core in the embodiments of FIGS. 2 and 3 or where the helical grooves reverse their pitch in the embodiment of FIG. 4) a series of N left hand helical turns continues down the core for a distance "a". The pitch of the helix, which is the axial distance per turn, is the ratio of the length "a" over the number of turns "N" in that length as they wrap around the core of diameter "2R". The initial helix angle $\theta$, is the angle which the helically wound essentially nonextensible cord-like member makes with respect to the plane normal to the axis of the core. It can be visualized for study by unwrapping the imaginary right triangle shown in the upper part of part B of FIG. 5, from around the core. One will note that the hypotenuse of this triangle, which is of length "l", corresponds exactly to the length of the essentially non-extensible cord-like member. The right triangle shown in the lower portion of part B of FIG. 5 is the distorted version of the upper triangle that accompanies the longitudinal elongation or stretching of "a" by an amount "$\Delta a$" when the cord length "l" remains unchanged during the process. Equating the two expressions for "l" leads to equation (1) of part C of FIG. 5, which represents the case in which the cord has infinite longitudinal stiffness. If, on the other hand, the longitudinal stiffness of the cord, although still greater than that of the core, is somewhat more comparable to that of the core, computations must also allow for a stretching of the cord. This stretching causes "l" to increase by an amount "$\Delta l$" when "a" increases by an amount "$\Delta a$". Making this modification, leads to equation (5) of part C of FIG. 5, which relates the number of forced rotations of the core at the pitch reversal point to the stated parameters and variables which include the strain in the cord and the longitudinal strain in the core assembly.

Referring to equation (1) in part C of FIG. 5, as the length of a vibration isolation module of part A undergoes a longitudinal strain, the number of turns or rotations at the pitch reversal point with respect to the end caps, is given by the quantity $\Delta N$. The theoretical taut limit, which is the maximum amount the vibration isolation module of part A could be hypothetically stretched if the cords were truly nonextensible, would occur when the quantity B equals 1 and $\Delta N = -N$. At this condition, the nonextensible cord-like member 25 would be under infinite tension and would be stretched straight between opposite ends of the module. At the other extreme is the zero response or zero rotation condition that occurs whenever the reduction in cross-section of the core due to the Poisson effect and the change in pitch of the essentially nonextensible cord-like member occurring when the core is stretched balance each other without the need for any core rotation at the pitch reversal point. This $\Delta N = 0$ condition occurs whenever condition (4) of part C of FIG. 5 is satisfied.

Figure 6:
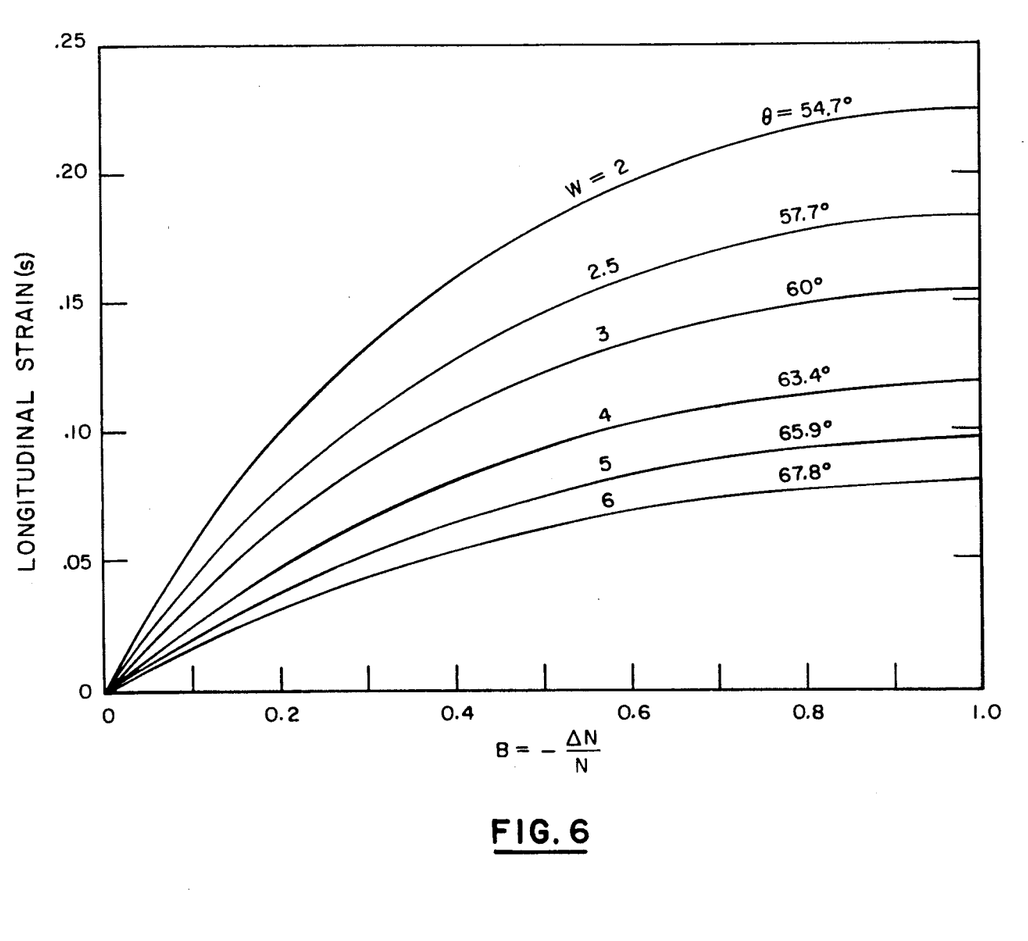
FIG. 6 is a graph showing the relation between the longitudinal strain and the fractional unwinding (torsional twisting) that takes place in the core as the nonextensible cord-like members straighten. (B=0 corresponds to the initial unstrained condition, and B=1 corresponds to the extension at which the cord-like members have become straight and taut. The individual curves are for the indicated initial helical angles, $\theta$.)

Looking to FIG. 6 several curves have been plotted to show the nonlinearity of the relation between longitudinal strain of the module and the parameter B for several initial helix angles of the essentially nonextensible member. A helix angle (theta) = 57.7° (W = 2.5), provides a buildable design with good dynamic range and desired operating characteristics. The one-inch diameter core fabricated from the VAMAC material has performed satisfactorily for the dynamic towing speeds of interest, and when used with longitudinally stiff, KEVLAR low-angle braided cord it provided characteristics similar to those shown on FIG. 6.

Figure 7A:
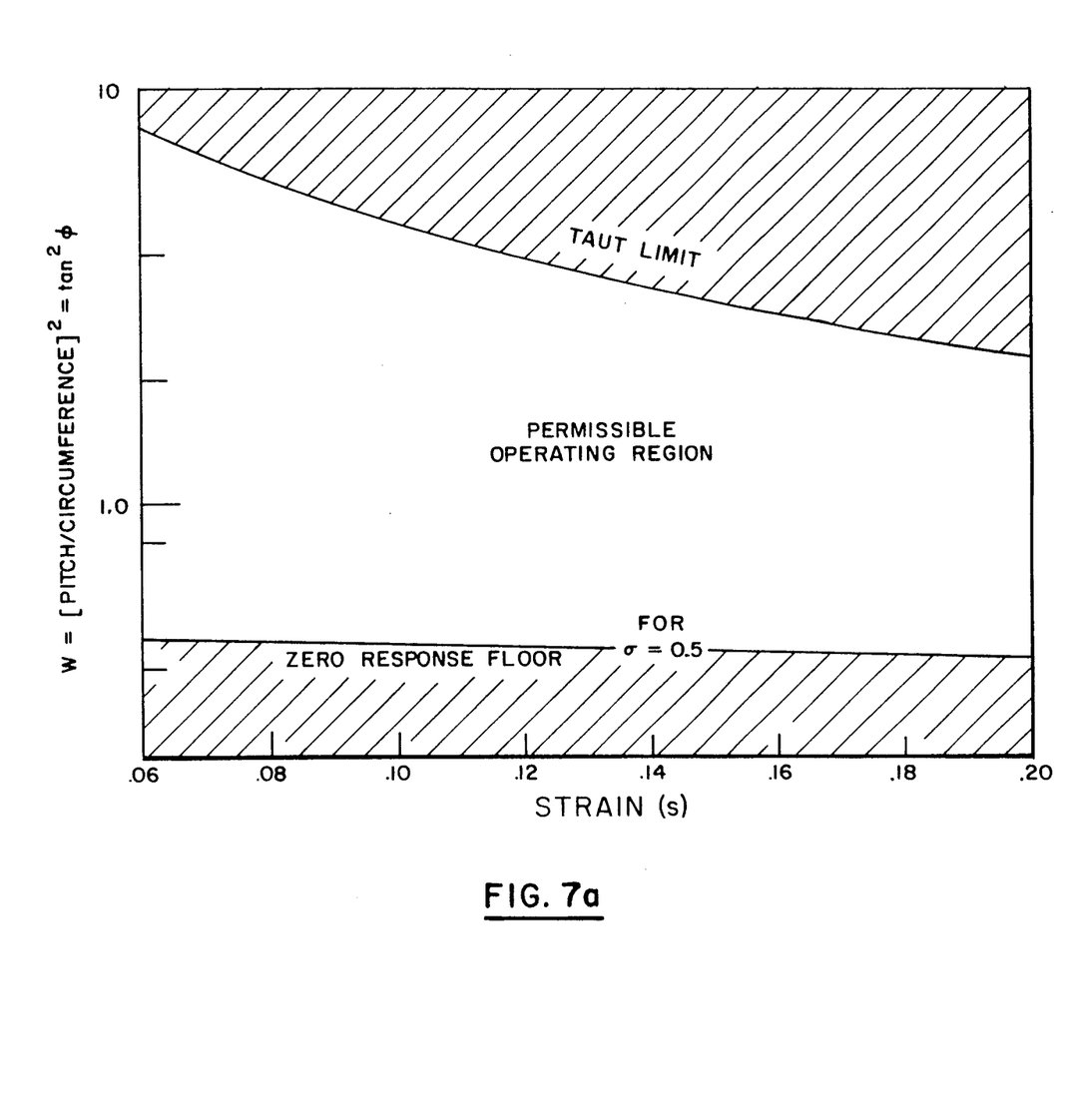
FIG. 7a displays the permissible operating region for the most desired type of operation, as a function of the design parameter, W, and the longitudinal strain, s. For values of W below the zero response floor, no rotation of the core occurs with stretching because the circumference of the core falls fast enough, due to Poisson's ratio, to accomodate the change in helix angle. Beyond the taut limit, any additional stretching can occur only with stretching of the cords.
Figure 7B:
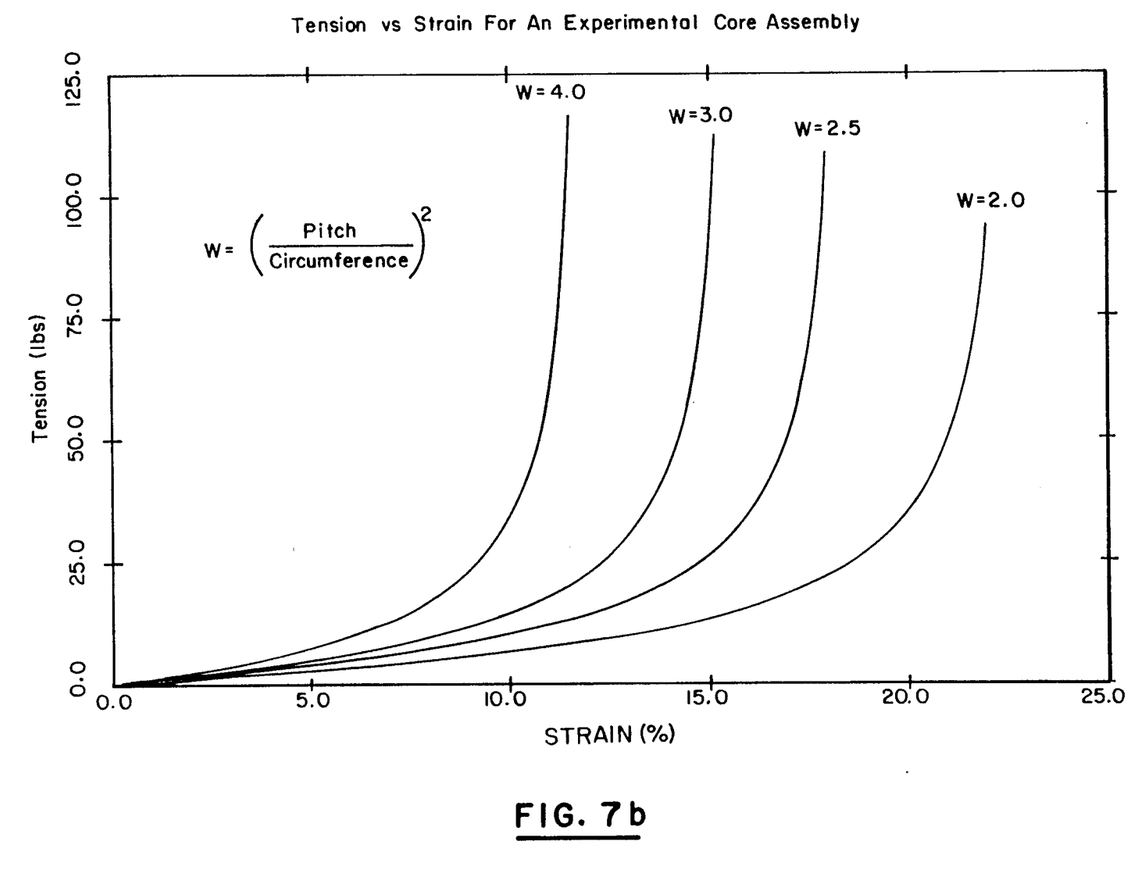
FIG. 7b is a graph showing the tension versus the longitudinal strain of a typical core for various values of the parameter W for the case in which the axial stiffness of the cords is extremely high. The marked up-bending of the curves displays the severe nonlinearity thereof.
Figure 7C:
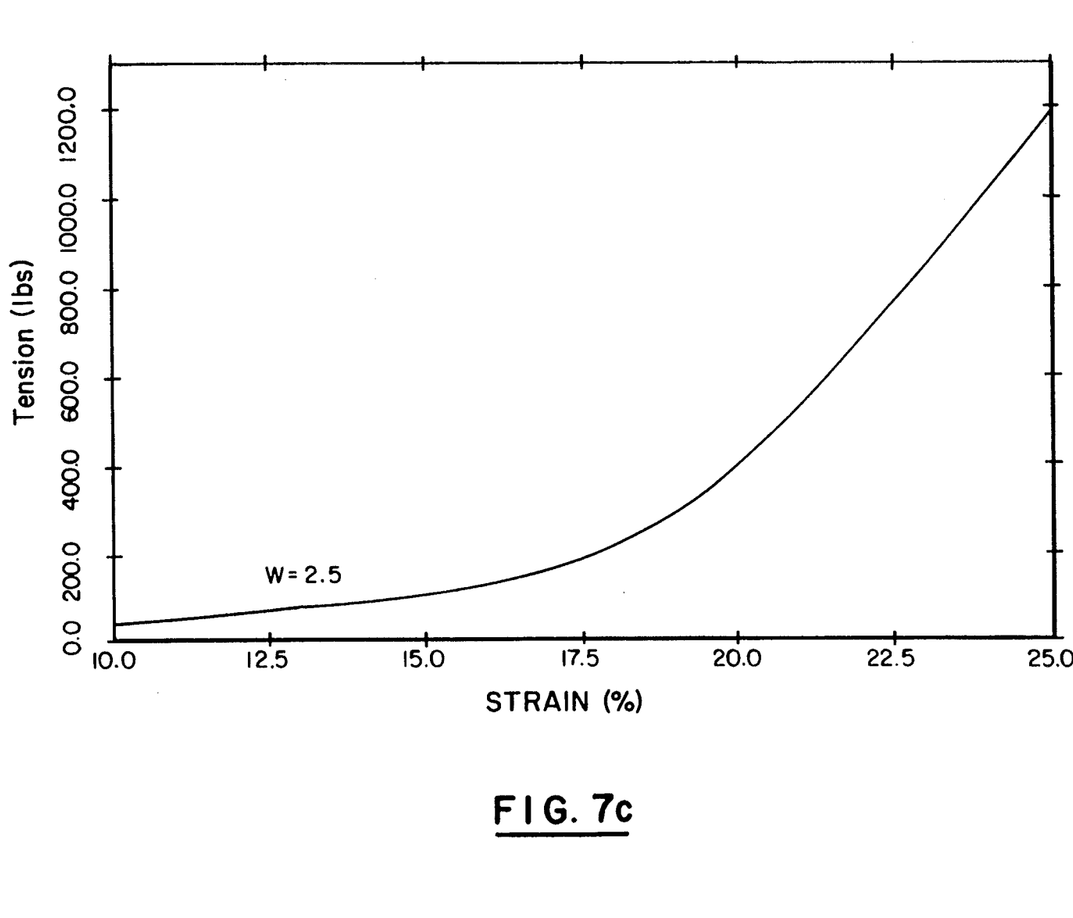
FIG. 7c presents data on a core in which the compliance of the core material is less and that of the cords is considerably greater than for the cores of FIG. 7b. The increase in dynamic range can be noted by comparing the ordinate ranges for the two figures.

FIG. 7A depicts the permissible operating region for a KEVLAR-corded core having a $\sigma = 0.5$ which lies between the taut limit of B = 1 and the zero response floor of B = 0. Within the permissible operating region shown, the helix angles could have the values set out in FIG. 6, and no severe limitations were apparent. The better choices for the initial helix angle at which the helically extending essentially nonextensible members are wrapped about the elastomeric core, varies from one cord material to another and from one core material to another and with the loads imposed by the dynamic operating range of the towed instrumentation package. However, with the many choices available in materials and parameters a designer has wide latitude in selecting the optimum design and can feel reasonably secure that destructive shocks and longitudinal motional disturbances will be effectively dissipated by the vibration isolation module. FIG. 7B and 7C present contrasting tension versus longitudinal strain curves for similarly sized core assemblies. FIG. 7B was obtained using a low modulus core and KEVLAR cords, and 7C, was obtained using a high modulus core and much more compliant double-braided nylon/polypropylene cords of a slightly larger diameter.

The tensile reaction for small extensions is dominated by the initial pitch of the cord-like torsion producing member and the elastic properties of the core. The tensile reaction for large extensions are dominated by the elastic properties of the cord-like torsion producing members, themselves, allowing appropriate selection of the initial and final slopes of the tension vs. elongation curve and the location of the knee therein. Also, when the rate of longitudinal extension is sufficiently increased (as can occur for a given vibrational amplitude when the frequency is increased or when one end of the module is subjected to large sudden excursions) the resistance of the core to changes in angular momentum must be taken into account. The resulting effect, which is related to both the time rate of change of angular momentum of the core and the instantaneous helix angle of the cord-like members, is to increase the apparent longitudinal stiffness of the module. Fortunately, the magnitude of this effect is proportional to the spacing between successive pitch reversals, and so adjusting the distance between pitch reversals provides an independent design tool for dealing with this effect.

Figure 8:
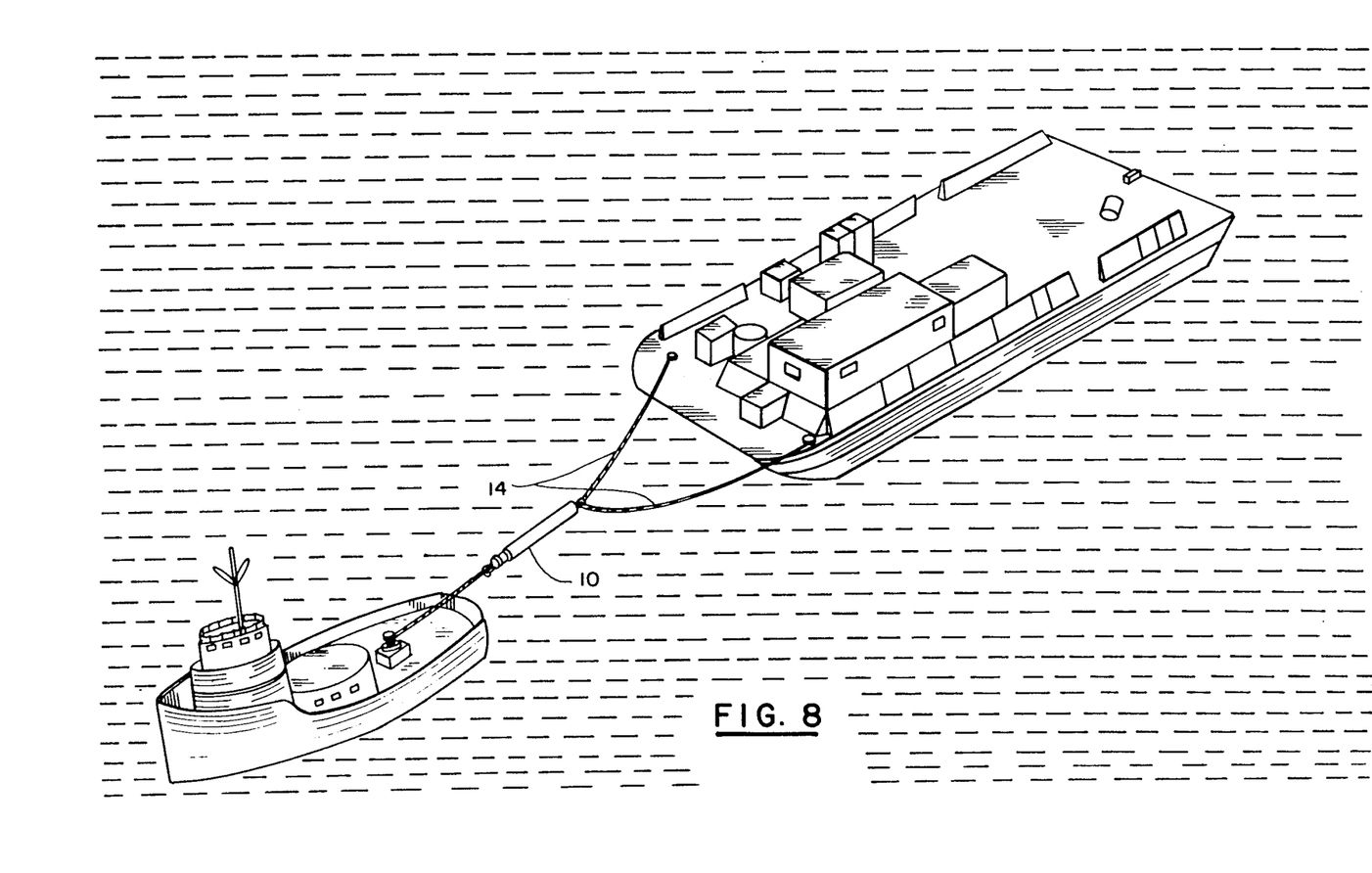
FIG. 8 is a vibration isolation module interposed in shortened hawsers coupled to a barge and a towing vessel.

Modifications of the disclosed concept lend themselves to a host of unique applications all of which serve to dissipate longitudinal shocks and motional disturbances. In FIG. 8 a vibration isolation module 10 is interposed between a tug and a barge. Note that the hawsers 14 are short compared to the lengths of line which normally separates a tug and barge. Conventionally, long towing hawsers have been found to be a necessary expedient to provide for an acceptable lessening of the effects of the yawing, heaving, pitching motions and other unsteady loads associated with towing. In addition to reducing the controllability of the barge the long hawsers store considerable energy and pose a real hazard if accidentally parted.

The vibration isolation module fabricated to anticipate the dynamic towing loads would necessarily have a larger core or consist of a number of such cores in parallel each having associated helically wound nonextensible members to bear the load. The severe strain that may result from high wind and storm conditions could be accommodated by a suitably designed nonlinear vibration isolation module without exposing the men and equipment to unacceptable hazards.

Figure 9:
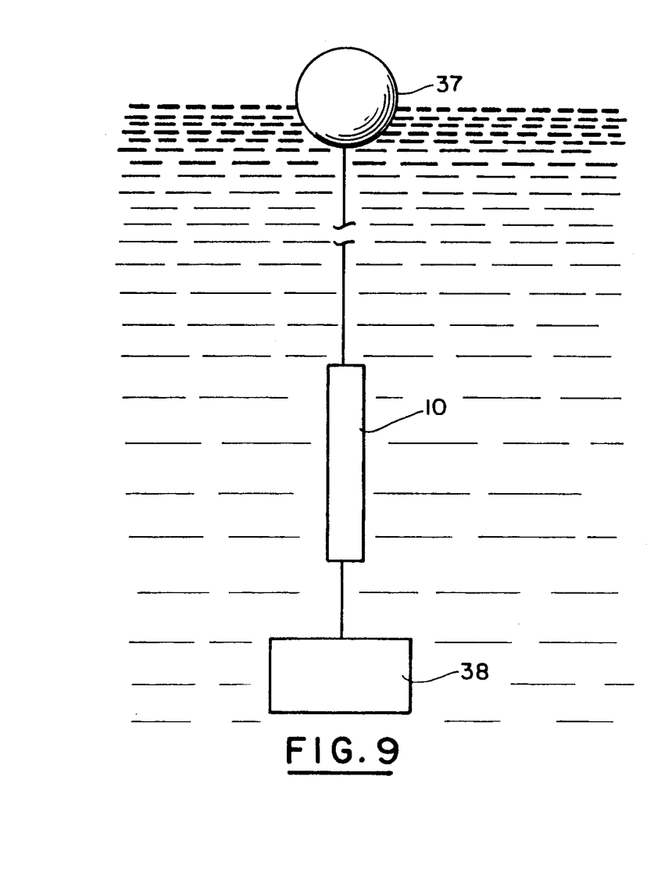
FIG. 9 shows a vibration module adapted to provide shock mitigation for an instrumentation package suspended from a floating platform or buoy.

The vibration isolation module can also serve in an oceanographic application as a damper for suspended loads, see FIG. 9. The wave induced motion of a supporting surface platform represented by buoy 37 is dampened by a vibration isolation module 10 from reaching a suspended, weighted instrumentation package 38. The materials of the vibration isolation module can be chosen to assure a soft damping and dissipation of the buoy induced motions during calm spells. The nonlinearity of the modules will also prevent severe shocks from being transmitted during severe sea states.

Figure 10:
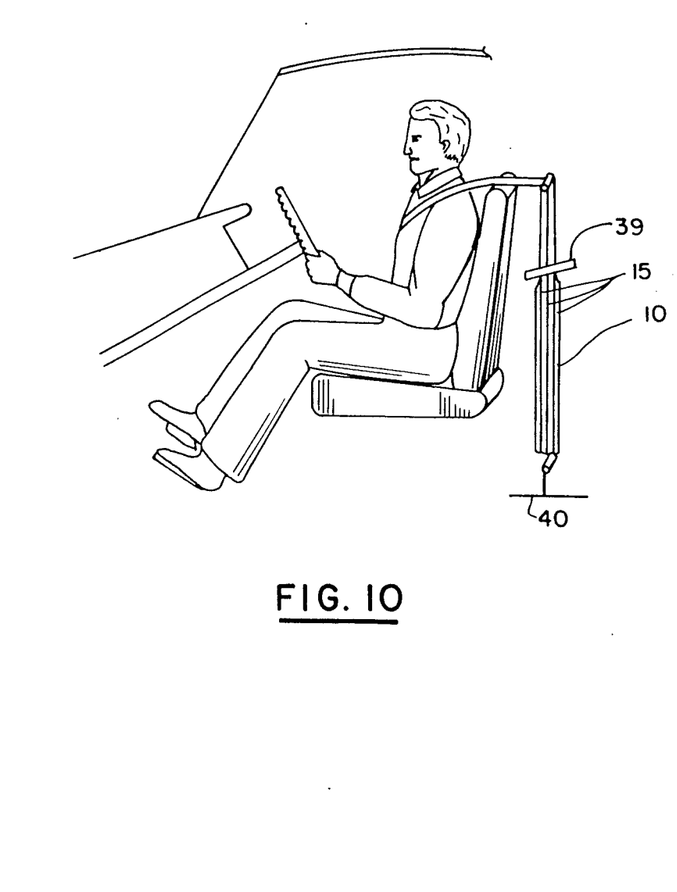
FIG. 10 is a representative depiction of a vibration isolation module adapted to a seatbelt or harness arresting structure.

A further application of the vibration isolation module is its use as a motion arresting device 10 in a restraining harness. Harnesses of this type are generally found in high-performance aircraft and other vehicles. A number of elastomeric cores 15 are disposed in a parallel relationship and each have a number of essentially nonextensible cord-like members helically wrapped thereabout with one or several pitch reversals. A strong back 39 and an anchor 40 at opposite ends coupled the modules to the arresting harness and to an anchor point to cushion the shocks and motional disturbances otherwise attributed to the violent maneuvering of such high speed craft.

Obviously many modifications and variations of the present invention are possible in the light of the above teachings. It is therefore to be understood that within the scope of the appended claims the invention may be practiced otherwise than as specifically described.

What is claimed is:

1. An apparatus for providing longitudinal shock mitigation and reducing the influences of longitudinal motional disturbances between terminal members coupled at opposite ends thereto comprising:

means coupled between the terminal members for compliantly and dissipatively yielding both in longitudinal extension and in torsion, the compliantly and dissipatively yielding means is a centrally located coaxially disposed core of a compliant dissipative material;

means coupled to and between the terminal members for imparting torsional strains to the compliantly and dissipatively yielding means such that the torsional strains increase nonlinearly with longitudinal strain, the torsional strain imparting means having the property of being relatively nonextensible as compared to the compliantly and dissipatively yielding means and the torsional strain imparting means is longitudinally disposed with respect to the compliantly and dissipatively yielding means in a helical configuration having at least one pitch reversal and being attached at least at the pitch reversal to the compliantly and dissipatively yielding means to assure the imparting of the torsional strains, the torsional strain producing means is at least one cord-like member, each helically disposed along its length coaxially about the core of the compliantly and dissipatively yielding material; and end fittings each connected to a terminal member and each disposed at an opposite end of the compliantly and dissipatively yielding means and the torsional strain imparting means and being connected at least to the torsional strain imparting means.

2. An apparatus according to claim 1 in which the compliantly and dissipatively yielding means is a centrally located coaxially disposed core of a compliant, dissipative material and each cord-like member is longitudinally, helically disposed thereabout and bonded thereto along their shared lengths in a motion imparting torsional coupling therewith.

3. An apparatus according to claim 1 in which the compliantly and dissipatively yielding means is provided with at least one helically extending groove having at least one pitch reversal with each groove containing a separate cord-like member disposed therein.

4. An apparatus according to claim 3 in which each cord-like member has the properties to show negligible strain relative to the compliantly and dissipatively yielding means up to where a predetermining tensile load is reached, beyond which each cord longitudinally strains to share the load to the extent it exceeds the predetermined tensile load.

5. An apparatus according to claim 1 in which each cord-like member has the properties to show negligible strain relative to the compliantly and dissipatively yielding means up to where a predetermining tensile load is reached, beyond which each cord longitudinally strains to share the load to the extent it exceeds the predetermined tensile load.

6. An apparatus according to claim 5 further including:
   a protective covering including a jacket disposed about the compliantly and dissipatively yielding means and the torsion strain imparting means and between the end fittings, the jacket being selected from a material having a complex modulus of elasticity to permit dissipative sharing of the longitudinal shocks and longitudinal motional disturbances and;
   a viscous fluid disposed between the compliantly and dissipatively yielding means and the jacket to produce dissipative shearing stresses therein when the longitudinal shock and longitudinal motional disturbances occur.

7. An apparatus according to claim 4 further including:
   a protective covering including a jacket disposed about the compliantly and dissipatively yielding means and the torsion strain imparting means and between the end fittings, the jacket being selected from a material having a complex modulus of elasticity to permit dissipative sharing of the longitudinal shocks and longitudinal motional disturbances and;
   a viscous fluid disposed between the compliantly and dissipatively yielding means and the jacket to produce dissipative shearing stresses therein when the longitudinal shock and longitudinal motional disturbances occur.

8. An apparatus according to claim 7 in which a plurality of pitch reversals, are created along the compliantly and dissipatively yielding means by the torsional strain imparting means and further including:
   at least one annular spacer, each disposed between the jacket and the compliantly and dissipatively yielding means and each located approximately midway between adjacent pitch reversals on a rotational node to transfer a jacket load to the compliantly and dissipatively yielding means and to assist in the conversion from one vibrational mode to another.

9. An apparatus according to claim 6 in which a plurality of pitch reversals are created along the compliantly and dissipatively yielding means by the torsional strain imparting means and further including:
   at least one annular spacer, each disposed between the jacket and the compliantly and dissipatively yielding means and each located approximately midway between adjacent pitch reversals on a rotational node to transfer a jacket load to the compliantly and dissipatively yielding means and to assist in the conversion from one vibrational mode to another.

10. An apparatus according to claim 8 further including:
    signal and energy conductors disposed between the compliantly and dissipatively yielding means and the jacket and extending the length thereof with each annular spacer being provided with at least one lateral opening to allow the passage of the signal and energy conductors therethrough.

11. An apparatus according to claim 9 further including:
    signal and energy conductors disposed between the compliantly and dissipatively yielding means and the jacket and extending the length thereof with each annular spacer being provided with at least one lateral opening to allow the passage of the signal and energy conductors therethrough.

12. An apparatus according to claim 8 in which there are provided a plurality of compliantly and dissipatively yielding means and torsional strain imparting means combinations coupled in parallel to provide addition load bearing capacity and additive shock mitigation and reduction of the influences of longitudinal motional disturbances.

13. An apparatus according to claim 9 in which there are provided a plurality of compliantly and dissipatively yielding means and torsional strain imparting means combinations coupled in parallel to provide addition load bearing capacity and additive shock mitigation and reduction of the influences of longitudinal motional disturbances.

14. An apparatus according to claim 4 in which there are provided a plurality of compliantly and dissipatively yielding means and torsional strain imparting means combinations coupled in parallel to provide addition load bearing capacity and additive shock mitigation and reduction of the influences of longitudinal motional disturbances.

15. An apparatus according to claim 5 in which there are provided a plurality of compliantly and dissipatively yielding means and torsional strain imparting means combinations coupled in parallel to provide addition load bearing capacity and additive shock mitigation and reduction of the influences of longitudinal motional disturbances.

16. An apparatus according to claim 11 in which the terminal members are a towing cable and an acoustic array and an acoustic array and a drogue to assure responsive signals more representative of the incident acoustic energy of interest.

17. An apparatus according to claim 10 in which the terminal members are a towing cable and an acoustic array and an acoustic array and a drogue to assure responsive signals more representative of the incident acoustic energy of interest.

18. A method of providing longitudinal shock mitigation and reducing the influences of longitudinal motional disturbances between terminal members coupled at opposite ends thereto comprising:
    connecting at least one cord-like member to end fittings coupled to the terminal members and disposed at opposite ends of a core of compliant dissipative material and the cord-like members;
    compliantly and dissipatively yielding both in longitudinal extension and in torsion by the compliant dissipative material of the core along the length of the core coupled between the terminal members;
    imparting torsional strains to the compliant dissipative material of the core by the cord-like member which is helically wound thereabout and is coupled between the terminal members such that the torsional strains in the compliant dissipative material of the core increase nonlinearly with longitudinal strain, the cord-like member having the property of being relatively nonextensible as compared to (i.e. longitudinally stiffer than) the core and being longitudinally disposed with respect to the core in a helical configuration having at least one pitch reversal and being attached at least at the pitch reversal to the core to assure the imparting of the torsional strains.

19. A method according to claim 18 in which the core for the compliantly and dissipatively yielding is a centrally located coaxially disposed core of a compliant, dissipative material and each cord-like member is longitudinally, helically disposed thereabout and bonded thereto along their shared lengths in a motion imparting torsional coupling therewith.

20. A method according to claim 18 further including:
shaping the core for the compliantly and dissipatively yielding with at least one helically extending groove having at least one pitch reversal and providing a separate cord-like essentially nonextensible member disposed therein.

21. A method according to claim 20 further including:
sharing a tensile load exerted between the terminal members by the core and at least one-cord like member by the longitudinal strain thereof when the load exceeds a predetermined amount.

22. A method according to claim 18 further including:
sharing a tensile load exerted between the terminal members by the core and at least one-cord like member by the longitudinal strain thereof when the load exceeds a predetermined amount.

23. A method according to claim 21 further including:
providing a jacket disposed about the core for the compliantly and dissipatively yielding and the cord-like member for the torsional strain imparting and extending between the end caps;
selecting the jacket from a material having a complex modulus of elasticity to permit dissipative sharing of the longitudinal shocks and longitudinal motional disturbances and;
producing dissipative shearing stresses between the jacket and core in a viscous fluid disposed therebetween when the longitudinal shock and longitudinal motional disturbances occur.

24. A method according to claim 22 further including:
providing a jacket disposed about the core for the compliantly and dissipatively yielding and the cord-like member for the torsional strain imparting and extending between the end caps;
selecting the jacket from a material having a complex modulus of elasticity to permit dissipative sharing of the longitudinal shocks and longitudinal motional disturbances and;
producing dissipative shearing stresses between the jacket and core in a viscous fluid disposed therebetween when the longitudinal shock and longitudinal motional disturbances occur.

25. A method according to claim 23 further including:
creating a plurality of pitch reversals along the core for the compliantly and dissipatively yielding by the at least one cord-like member for the torsional strain imparting and:
annularly spacing the jacket and the core for the compliantly and dissipatively yielding by an annular spacer located approximately midway between adjacent pitch reversals on a rotational node to transfer a jacket load to the core for the compliantly and dissipatively yielding to assist in the conversion from one vibrational mode to another.

26. A method according to claim 24 further including:
creating a plurality of pitch reversals along the core for the compliantly and dissipatively yielding by the at least one cord-like member for the torsional strain imparting and:
annularly spacing the jacket and the core for the compliantly and dissipatively yielding by an annular spacer located approximately midway between adjacent pitch reversal on a rotational node to transfer a jacket load to the core for the compliantly and dissipatively yielding to assist in the conversion from one vibrational mode to another.

27. A method according to claim 25 further including:
providing signal and energy conductors disposed between the core for the compliantly and dissipatively yielding and the jacket along the length thereof with each annular spacer being provided with at least one lateral opening to allow the passage of the signal and energy conductors therethrough.

28. A method according to claim 26 further including:
providing signal and energy conductors disposed between the core for the compliantly and dissipatively yielding and the jacket along the length thereof with each annular spacer being provided with at least one lateral opening to allow the passage of the signal and energy conductors therethrough.

29. A method according to claim 21 further including:
coupling in parallel combinations of cores for the compliantly and dissipatively yielding with their respective at least one cord-like member for the torsional strain imparting to provide additional load bearing capacity and additive shock mitigation and reduction of the influences of longitudinal motional disturbances.

30. A method according to claim 27 further including:
coupling in parallel combinations of cores for the compliantly and dissipatively yielding with their respective at least one cord-like member for the torsional strain imparting to provide additional load bearing capacity and additive shock mitigation and reduction of the influences of longitudinal motional disturbances.

31. A method according to claim 28 further including:
coupling in parallel combinations of cores for the compliantly and dissipatively yielding with their respective at least one cord-like member for the torsional strain imparting to provide additional load bearing capacity and additive shock mitigation and reduction of the influences of longitudinal motional disturbances.

32. A method according to claim 22 further including:
couping in parallel combinations of cores for the compliantly and dissipatively yielding with their respective at least one cord-like member for the torsional strain imparting to provide additional load bearing capacity and additive shock mitigation and reduction of the influences of longitudinal motional disturbances.

33. A method according to claim 18 in which the step of connecting is to the terminal members of a seat belt or harness and anchor points to assure the shock mitigation safety of a seated occupant.

34. A method according to claim 29 in which the step of connecting is to the terminal members of a seat belt or harness and anchor points to assure the shock mitigational safety of a seated occupant.

35. A method according to claim 18 in which the step of connecting is to the terminal members of hawsers coupled to a barge and tug to provide shock mitigation and reduce the influences of longitudinal motional disturbances and provide for the reduction of the required length of, and problems associated with, long hawsers.

36. A method according to claim 29 in which the step of connecting is to the terminal members of hawsers coupled to a barge and tug to provide shock mitigation and reduce the influences of longitudinal motional disturbances and provide for the reduction of the required length of, and problems associated with, long hawsers.

37. A method according to claim 18 in which the step of connecting is to the members providing shock and vibration isolation between an underwater instrumentation package and a surface platform including boats and buoys.

38. A method according to claim 29 in which the step of connecting is to the members providing shock and vibration isolation between an underwater instrumentation package and a surface platform including boats and a buoy.

39. A method according to claim 27 in which the step of connecting is to the members providing shock and vibration isolation between an underwater instrumentation package and a surface platform including boats and buoys.

40. A method according to claim 28 in which the step of connecting is to the members providing shock and vibration isolation between an underwater instrumentation package and a surface platform including boats and buoys.

* * * * *